T. J. LINDSAY.
AUTOMOBILE.
APPLICATION FILED APR. 6, 1908.

925,779.

Patented June 22, 1909.
2 SHEETS—SHEET 1.

Witnesses
Frank A. Fahle
Thomas H. McMeans

Inventor
Thomas J. Lindsay
By Bradford Hood
Attorneys

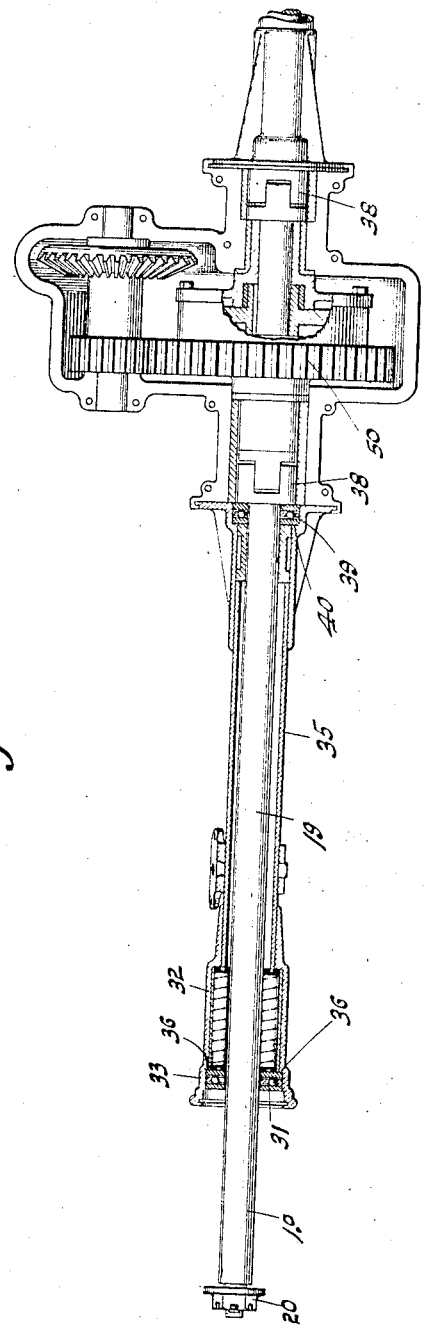

UNITED STATES PATENT OFFICE.

THOMAS J. LINDSAY, OF INDIANAPOLIS, INDIANA, ASSIGNOR OF ONE-HALF TO WILLIARD HARMON, OF INDIANAPOLIS, INDIANA.

AUTOMOBILE.

No. 925,779.  Specification of Letters Patent.  Patented June 22, 1909.

Application filed April 6, 1908. Serial No. 425,520.

*To all whom it may concern:*

Be it known that I, THOMAS J. LINDSAY, a citizen of the United States, residing at Indianapolis, in the county of Marion and State of Indiana, have invented certain new and useful Improvements in Automobiles, of which the following is a specification.

The object of my present invention is to provide a construction by means of which ordinary and standard buggy wheels of the wool-filled-hub type may be used for the power traction wheels of an automobile in a construction wherein the power is applied thereto by power shafts directly connected to the wheels, the construction being such that the intermediate differential connection between the shafts of the two traction wheels is relieved from all thrusts of the traction wheels.

The accompanying drawings illustrate my invention.

Figure 1:
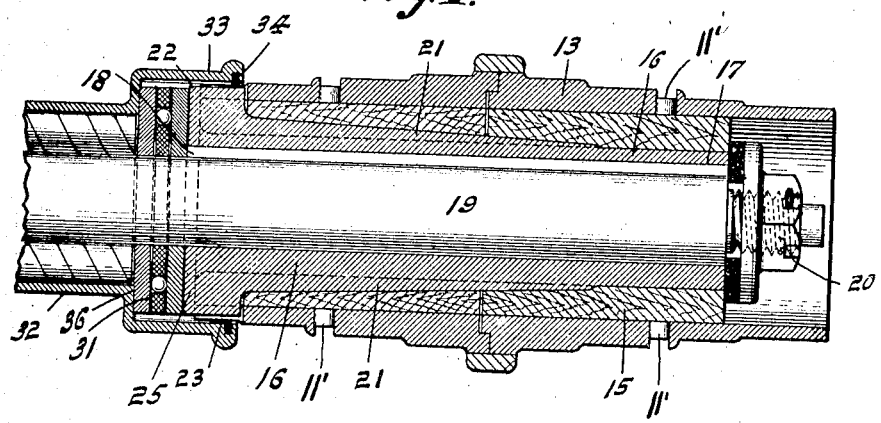
Figure 2:
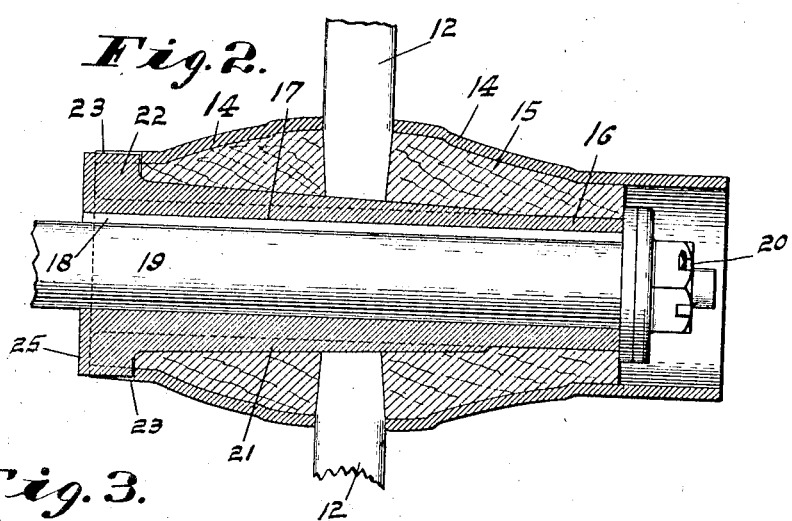
Figure 3:
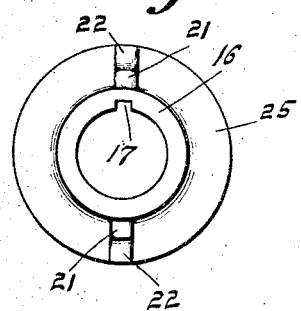
Figure 4:
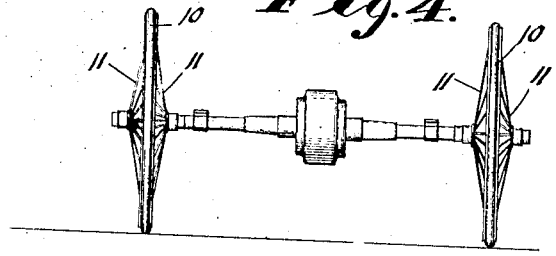

Figure 1 is an axial section of a standard wheel hub equipped with my improvement and attached to the end of a driving shaft properly mounted in the supported structure; Fig. 2 an axial section of another common and standard wheel hub, having wooden spokes, equipped with my improvement; Fig. 3 an end elevation of my improved bushing; Fig. 4 a rear elevation, on a smaller scale, of a complete traction structure constructed in accordance with my invention; and Fig. 5 a section of such structure omitting a part of one end and the traction wheels.

In the drawings, 10 indicates a standard wheel having wire spokes 11 connected to a metal hub structure 13 at the points 11'. If desired a wheel having wooden spokes 12 and a metal hub 14 may be used instead of the form shown in Fig. 1, or any other standard wood-filled-hub type may be used. In either form of hub the metal portion thereof is commonly filled with wood 15 and it has been heretofore customary to provide such wooden filler with a centrally arranged wearing bushing driven thereinto. Such bushing however has had no connection with the metal portion of the hub and was therefore incapable of transmitting successfully any driven power to the wheel and also incapable of sustaining the thrusts resulting from the use of a wheel as the traction wheel for a motor vehicle. Instead of the ordinary bushing therefore I provide a metal bushing 16 which extends axially through the wooden filler 15 and is provided interiorly with a keyway 17 by means of which it may be connected through a key 18, or other suitable driving connection, with a driving shaft 19. Bushing 16 is provided exteriorly with radial ribs 21 which preferably increase gradually in radial dimension and, near their outer ends, are increased radially at 22 to such an extent as to lie within radial notches or recesses 23 formed in the end of the bushing 15 and in the adjacent portion of the metal hub 13 or 14. At this end the bushing 16 is provided with a flange or head 25 which forms a cap for the inner end of the wheel hub so as to form an abutment for one member of a thrust-bearing 31 mounted in the outer end of a suitable structure 32 said structure having a flange 33 adapted to incase the thrust bearing 31 and inner end of the wheel hub and carry, if desired, a dust excluding ring 34 adapted to engage the wheel hub.

The structure 32 is preferably a part of an inclosing casing or axle structure 35 to which the body or framework of the automobile may be attached and upon which said body or frame may be supported. The shaft sections 19 are journaled within the structure 35 and the thrust bearings 31 are sleeved over said shafts and engage a shoulder 36 in the part 32. In order to relieve the differential driving structure 50 from any thrusts of the traction wheels I provide the inner end of each shaft 19 with a head 38 adapted to engage a thrust bearing 39, said thrust bearing lying between a shoulder 40, of the structure 35, and the head 38, the head 38 being provided with means by which it may be rotatably connected to the adjacent portion of the differential structure 50. The traction wheel with its bushing 16 slips freely axially upon the shaft 19 and its key 18 and engages the thrust bearing 31, being held in one direction on the shaft 19 by any suitable axially-adjustable means such, for instance, as the nut 20 mounted upon the threaded outer end of the shaft 19 and held in any position of axial adjustment by any suitable means as shown. By this construction it will be noted that the nut 20 serves to draw head 38 against the thrust bearing 39 and to draw the flange of the bushing of the traction wheel against the thrust bearing 31, simultaneously forcing the two thrust bearings against their respective shoulders and thus holding the shaft 19 against axial play and preventing the transmission of any wheel thrusts through the shafts to the differential.

By this arrangement I have been able to utilize standard high buggy wheels for automobile driving wheels without resorting to the now common expedient of applying driving power to such wheels through the medium of chains passed over comparatively large sprocket wheels attached to the spokes of the driving wheels, my construction, on the contrary, having all of the advantages of center driving at a cost materially less than can be accomplished with specially made wheels such as are now commonly used in automobile construction.

I claim as my invention:—

1. An automobile wheel comprising a wheel body having a wood-filled metal hub, and a metal bushing mounted in the filling and having a fixed portion engaging the metal hub but axially separable therefrom to prevent relative rotation.

2. An automobile wheel comprising a wheel body having a wood-filled metal hub, and a metal bushing mounted in the filling and provided interiorly with means for non-rotative connection with a drive shaft and exteriorly with a radial rib lying within a notch in the metal hub.

3. The combination of an automobile wheel comprising a wheel body having a wood-filled metal hub, and a metal bushing axially-separably mounted in the filling and having a fixed portion engaging the metal hub to prevent relative rotation, a shaft non-rotatively connected to said bushing, a casing within which the shaft is journaled, and a thrust bearing arranged between the casing and the adjacent end of the bushing.

4. The combination of an automobile wheel comprising a wheel body having a wood-filled metal hub, and a metal bushing mounted in the filling and provided interiorly with means for non-rotative connection with a drive shaft and exteriorly with a radial rib lying within a notch in the metal hub, a casing within which the shaft is journaled, and a thrust bearing arranged between the casing and the adjacent end of the bushing.

5. In an automobile, the combination of an inclosing casing, a pair of shaft sections journaled therein and each having a headed inner end, a thrust bearing arranged between said headed inner end and the inclosing casing to prevent outward axial displacement of its shaft section, a thrust bearing mounted upon the outer end of each shaft section and engaging the casing in the direction opposite to the other thrust bearing, and a wheel mounted upon the outer end of each shaft section outside the last mentioned thrust bearing, each of said wheels having a wood-filled hub with a metal casing, a metal bushing within said wood filling and splined upon the shaft section, said metal bushing having an inner end adapted to engage the adjacent thrust bearing and having ribs non-rotatably engaging the metal shell of the hub, and means for holding each wheel upon its shaft section, substantially as and for the purpose set forth.

In witness whereof, I have hereunto set my hand and seal at Indianapolis, Indiana, this fourth day of April, A. D. one thousand nine hundred and eight.

THOMAS J. LINDSAY. [L. S.]

Witnesses:
ARTHUR M. HOOD,
THOMAS W. MCMEANS.